United States Patent [19]
Manning

[11] 4,432,595
[45] Feb. 21, 1984

[54] OPTICAL ELEMENT FOR PHOTOGRAPHIC RADIOMETER

[75] Inventor: Monis J. Manning, Lexington, Mass.

[73] Assignee: Polaroid Corporation, Cambridge, Mass.

[21] Appl. No.: 297,774

[22] Filed: Aug. 31, 1981

Related U.S. Application Data

[62] Division of Ser. No. 99,599, Dec. 3, 1979, Pat. No. 4,335,959.

[51] Int. Cl.³ ............................................. G02B 5/22
[52] U.S. Cl. ..................................................... 350/1.1
[58] Field of Search ..................... 350/1.1, 1.3, 1.4, 1.7

[56] References Cited

U.S. PATENT DOCUMENTS

| | | | |
|---|---|---|---|
| 2,881,663 | 4/1959 | Dearborn | 88/106 |
| 2,895,955 | 7/1959 | Heseltine et al. | 260/240.5 |
| 2,992,938 | 7/1961 | McCarville et al. | 117/16 |
| 3,042,624 | 7/1962 | Coleman | 252/300 |
| 3,270,638 | 9/1966 | Anwyl et al. | 95/10 |
| 3,271,156 | 9/1965 | Sawdey | 96/80 |
| 3,291,746 | 12/1966 | Donoian et al. | 252/300 |
| 3,417,083 | 12/1968 | Reynolds et al. | 260/240 |
| 3,471,212 | 10/1969 | Sloane | 350/1 |
| 3,588,216 | 6/1971 | Bloom | 350/1.1 |
| 3,623,794 | 11/1971 | Brown | 350/316 |
| 3,687,862 | 8/1972 | Bloom | 252/300 |
| 3,722,977 | 3/1923 | Sloane | 350/1 |
| 3,743,847 | 7/1973 | Boland | 250/510 |
| 3,903,413 | 9/1975 | Manning | 250/226 |
| 3,942,184 | 3/1976 | Blinow et al. | 354/42 |
| 3,979,583 | 9/1976 | McCan | 240/1.3 |
| 4,040,070 | 8/1977 | Hochreiter et al. | 354/59 |
| 4,040,751 | 8/1977 | Baker et al. | 356/225 |
| 4,102,581 | 7/1978 | Plummer | 356/225 |
| 4,105,300 | 8/1978 | Plummer | 356/225 |
| 4,156,564 | 5/1979 | Tsuneka et al. | 354/59 |

Primary Examiner—Bruce Y. Arnold
Attorney, Agent, or Firm—Francis J. Caufield

[57] ABSTRACT

An optical element for filtering infrared light for use in a radiometer is disclosed wherein at least one metal-organic infrared absorbing dye is at least partially dissolved homogeniously throughout a molded optical plastic.

12 Claims, 12 Drawing Figures

OPTICAL ELEMENT FOR PHOTOGRAPHIC RADIOMETER

This is a Division of application Ser. No. 099,599, filed Dec. 3, 1979, now U.S. Pat. No. 4,335,959.

BACKGROUND OF THE INVENTION

1. Field of the Invention

This invention in general relates to a photoelectric device by which radiant energy from a photographic scene is spectrally filtered to provide control signals that are suitable for use in photographic exposure control applications and in particular to optical elements and methods for making optical elements containing infrared absorbing dyes which provide preferred spectral sensitivity characteristics for such devices.

2. Description of the Prior Art

What a photographer would like to achieve when he takes a picture is to have a permanent record which faithfully reproduces his subject or scene or at least those aspects of his subject or scene which he considers most important. He judges the quality of the photographic reproduction by visually comparing the print with the original scene in the case of self-developing type film where the print is nearly immediately available or with what he remembers the scene to be in the case of more conventional type films. In making this judgment he is comparing the magnitude of the visual sensation created by the photograph under the prevailing viewing conditions with the magnitude of the visual sensation created by the original scene under the actual lighting conditions or what he remembers them to be, i.e., he compares the brightness of various points in the photograph with the brightness of corresponding points in the original scene and thereby forms a subjective opinion about the quality of the reproduction. Exact subjective tone reproduction requires that the brightness of each point in the photograph equal that of the brightness of corresponding points in the original scene. However, as those skilled in the photographic arts know, exact subjective tone reproduction is extraordinarily difficult and inconvenient to achieve because photographs are generally viewed at illumination levels which are significantly less than those under which the photograph was taken—typically about 1/100 that of the original scene. This fact and the fact that most films, as their sensitometric characteristics indicate, have a limited ability to capture the range of tones which typically exist in nature would seem to indicate that a photographer, amateur or professional, could never be satisfied by the photographs that can be produced with the present level of photographic technology. However, this is obviously not the case and the reason for it is that satisfactory subjective tone reproduction can be obtained and will please the photographer if the photographic brightnesses under ordinary viewing conditions are approximately proportional to corresponding scene brightnesses, if the brightness of photographic skin tones approximately equals that of real skin under the prevailing viewing conditions, if the apparent hue and saturation of object colors is maintained relative to the original scene, and if the film reproduces tones corresponding more or less to the range of tones represented by the important objects of the scene.

To assure that the foregoing conditions are more or less satisfied depends, ultimately, on properly exposing the film taking into account the particular scene characteristics, prevailing scene lighting conditions, film characteristics, and camera optical system performance. Given the variety of possible scenes and lighting conditions, proper exposure can only be achieved regularly by understanding the complex interrelationships of the photographic system and some probability estimate of the likelihood of the occurrence of typical scenes. This would include knowing, for example, the most likely distribution and intensities of scene illuminance patterns expected to be photographed, the spectral reflectivity of commonly recurring objects expected to be photographed, the spectral content of likely scene illuminance, and the spectral response and sensitometric characteristics of the film. In currently available amateur camera products, all of these interrelationships are typically automatically correlated for optimum exposure by a camera's automatic exposure control system which commonly utilizes a built-in "averaging" or "center-weighted" type meter for exposure prediction purposes.

One of the most popular known averaging type exposure meters for evaluating scene brightnesses to predict and/or control photographic exposures is the unicell photometer. Typical examples of such unicell photometers for exposure control purposes are shown and described in U.S. Pat. No. 4,040,751 issued to Philip G. Baker, et al., on Aug. 9, 1977, entitled "Unicell Photometer Device"; U.S. Pat. No. 4,102,581 issued to William T. Plummer on July 25, 1978, and entitled "Unicell Photoelectric Photometer"; and U.S. Pat. No. 4,105,300 also issued to William T. Plummer, Aug. 8, 1978, and entitled "Defocused Unicell Photometer with Aspheric Zone".

The disclosures in the aforementioned patents indicate that it is desirable for such unicell photometers to have a nearly precisely photometric response whose spectral sensitivity is substantially identical to the photopic visual response curve of a standard photometric observer according to the Commission Internationale de l'Eclairage, CIE. This is achieved by altering the spectral response characteristics of the photodetector of these photometers, which is preferably a silicon photodiode, through the use of well-known commercially available light attenuating filters that remove most of the light in the IR region of the spectrum from 700 to 1200 nanometers. Thus, these photometers prevent near IR light which is present in the photographic scene from reaching the photometer system of the camera so that the spectral response of the photometer system closely matches that of the photographic film which also is typically sensitive to only light in the visible region of the spectrum. Thus in photographic systems which utilize these types of photometers, the spectral response characteristics of the observer, the photometer and the film are substantially identical.

One reason for matching the spectral response of these types of photometers to the visual response of the human eye is to avoid any exposure variations which may be introduced as a result of differences in the spectral energy content or correlated color temperatures of scene illuminance sources. For example, if the scene illuminance source color temperature is low, say less than 2800° K., then the slightest leak of IR light can result in underexposure as a result of the high IR content of this radiation. High color temperatures, say greater than 7000° K., have excessive blue light content which results in overexposure of film because the photometer has poor blue response and cannot be precisely photometric under this spectrally unbalanced lighting situation. Although these unicell photometers avoid such variations and, as well, are designed to optimize exposure performance over the widest possible range of anticipated scene conditions, further complications in exposure can arise that are less dependent on source color temperature variations. These complications arise when the reflectivities of different objects in photographic scenes exhibit widely different values. Under the situation, for example, where the facial skin of a subject reflects more light than the surrounding clothing or other objects, a scene-averaged photometric response will favor correct exposure of the darker objects, rendering the facial skin (or any other high reflectivity object) substantially overexposed. On the other hand, if the scene consists largely of high reflectivity objects, the same facial skin may be underexposed since, again, the photometer response is to the scene-averaged high reflectivity.

These phenomena apparently occur because the silicon photodetector, once protected from recovering any IR radiation, responds only to the different reflectivities of the scene which are in the visible spectral region. This means that the photometer response is dependent on its acceptance angle or angular response characteristic and this can lead to poor exposure control in complex reflected light situations.

Therefore, there is still a need for an improved unicell type radiation measuring device which will tend to alleviate the aforementioned exposure control problems in photographic exposure control applications, and it is a primary object of the present invention to provide such a device.

It is another object of this invention to provide an improved radiation measuring device having a preferred relative spectral sensitivity characteristic, both in the visible and near IR regions of the spectrum, by which exposure control capability is improved as a result of advantageously utilizing the reflected IR radiation from commonly occurring photographic scene objects.

It is yet another object of this invention to provide novel molded optical elements which include certain metal-organic infrared absorbing dyes, such as those described in U.S. Pat. No. 3,588,216 issued to Stanley M. Bloom on June 28, 1971 and entitled "Plastic Optical Element" and U.S. Pat. No. 3,687,862 also issued to Stanley M. Bloom on Aug. 29, 1972 and entitled "Plastic Optical Elements", by which the preferred relative spectral sensitivity of the invention can be provided. Although the dyes described in the aforementioned Bloom patents have been used in photoflash filters as described in U.S. Pat. No. 3,979,583 issued to John J. McCan on Sept. 7, 1976 and entitled "Photoflash Filter", it is believed that their use as described hereinafter is novel.

SUMMARY OF THE INVENTION

This invention in general relates to photographic devices by which radiant energy from a photographic scene is spectrally filtered to provide control signals that are suitable for use in photographic exposure control applications and in particular to optical filtering elements and methods for making optical filtering elements containing infrared absorbing dyes which provide such devices with preferred spectral sensitivity characteristics which operate to minimize exposure errors that can occur in certain types of photographic scenes containing objects exhibiting widely different visible reflectivities.

The optical element of the invention is of the type that is particularly suitable for use in a radiometer of the type which includes a photoelectric cell that has a predetermined surface and spectral sensitivity and provides an output signal having an electrical characteristic that varies in accordance with the intensity of radiant power incident on its surface. In its preferred embodiment, the inventive optical element is a positive lens comprising polycarbonate or polystyrene for collecting radiant energy from a photographic scene to direct the collected radiant energy onto the photoelectric cell surface and includes at least one metal-organic infrared absorbing dye, in low concentrations, at least partially dissolved homogeneously throughout and commonly molded with the optical plastic to selectively attenuate the spectral content of the collected radiation.

The preferred infrared absorbing dye comprises a metal complex of the formula:

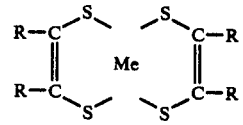

wherein Me is selected from the group consisting of metals of the first, second and third transition metal series which will provide a complex that is an effective infrared absorber and which is effectively transparent to light in the visible region of the spectrum; and each R is selected from the group consisting of hydrogen, alkyl, aromatic, heterocyclic and nuclearly substituted aromatic and heterocyclic rings.

Novel plastic injection molding methods for preparing the preferred optical element of the invention are also disclosed.

BRIEF DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment and method when read in connection with the accompanying drawings wherein like numbers have been employed in the different figures to denote the same parts and wherein:

DESCRIPTION OF THE PREFERRED EMBODIMENT

The present invention relates to a photoelectric type radiometer that is provided with a preferred relative spectral sensitivity by which improved exposure prediction performance is achieved compared to prior art devices in photographing scenes containing objects exhibiting widely different visible reflectivities, to optical elements by which the preferred relative spectral sensitivity of the inventive radiometer can be provided, and to methods for making such optical elements.

Figure 1:
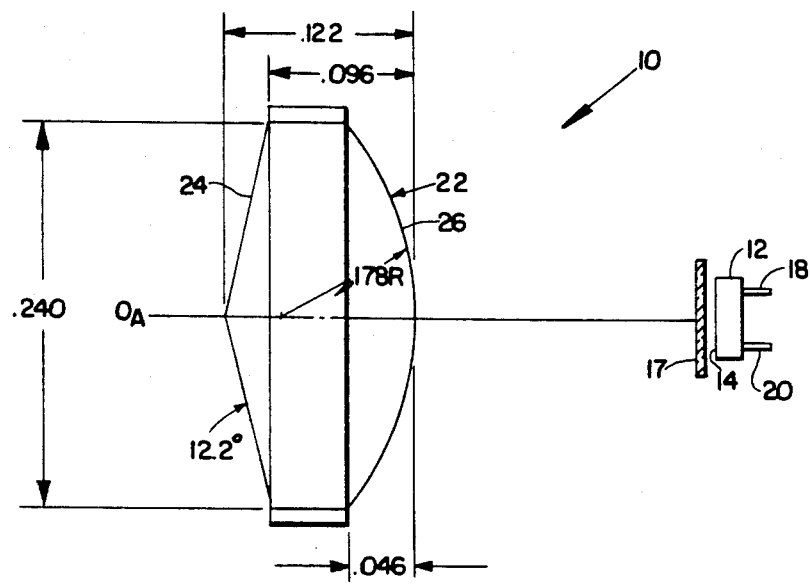
FIG. 1 is an enlarged top view of the preferred embodiment of the radiometer of the invention.
Figure 2:
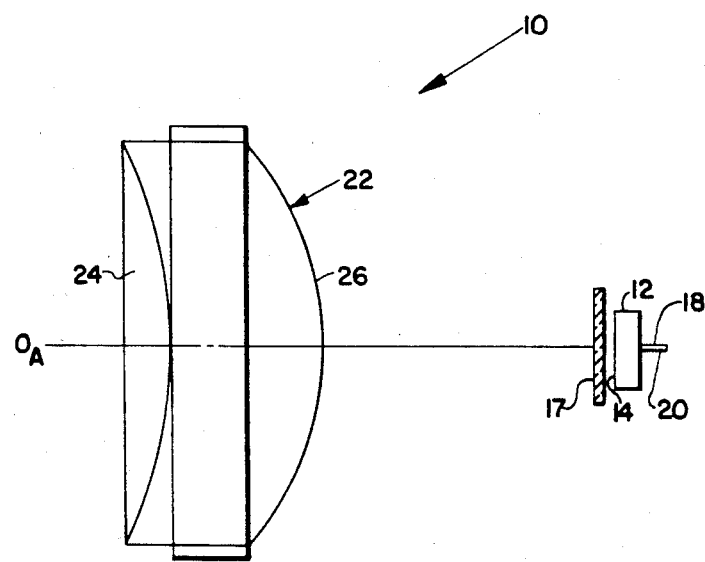
FIG. 2 is an enlarged side view of the radiometer of FIG. 1.

Referring now to FIGS. 1 and 2, there is shown at 10 the preferred embodiment of the radiometer of the present invention. The radiometer 10 comprises photodetector means, preferably in the form of a silicon photodiode 12, for providing an output signal having an electrical characteristic that varies in accordance with the intensity of the average radiant power incident on a photosensitive surface 14 thereof. The photodiode 12 has a relative spectral sensitivity substantially as represented by the curve 16 of FIG. 3. A pair of electrical leads, 18 and 20, provide a means by which the electrical output signal from the photodiode 12 can be used in a well-known manner, as with an exposure computer, to directly predict an exposure value for a photographic scene as based on the magnitude of the output signal.

An optical element comprising a positive lens 22 is provided for collecting radiant energy in a well-known manner from a predetermined part of a scene to be photographed and directing such collected radiation onto the photodiode surface 14. The optical element 22 includes a wedge shaped front surface 24 and a convex, rear spherical surface 26 which together provide the radiometer 10 with different horizontal and vertical specific acceptance angles in the manner described in considerable detail in aforementioned U.S. Pat. No. 4,102,581. The lens 22 has a predetermined focal length and is preferably spaced forwardly of the photodetector surface 14 so that light is not sharply focused thereon. The lens 22 is molded of an optical plastic, preferably polycarbonate or polystyrene, and preferably in the dimensions shown in inches in FIG. 7.

In a manner to be described, there are two metalorganic infrared absorbing dyes molded with and homogeneously distributed throughout the lens 22. Both of these dyes, 1 and 2, are at least partially dissolved in the optical plastic of the lens 22 and operate to selectively attenuate the relative spectral energy distribution of radiation collected by the lens 22 and to provide the radiometer 10 with preferred relative spectral sensitivities (see FIG. 6, curves 38, 40 and 42).

Each of the infrared absorbing dyes, 1 and 2, comprise a metal complex of the formula:

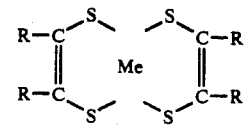

wherein Me is selected from the group consisting of metals of the first, second, and third transition metal series which will provide a complex that is an effective infrared absorber and which is effectively transparent to light in the visible region of the spectrum; and each R is selected from the group consisting of hydrogen, alkyl, aromatic, heterocyclic and nuclearly substituted aromatic and heterocyclic rings.

The first infrared absorbing dye (Dye 1) is a metal complex preferably chosen from the group consisting of:

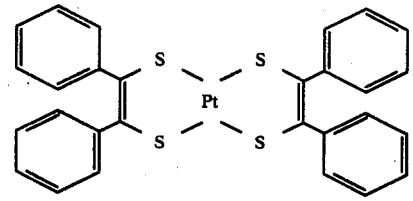

and the second dye (Dye 2) is preferably chosen from the group consisting of:

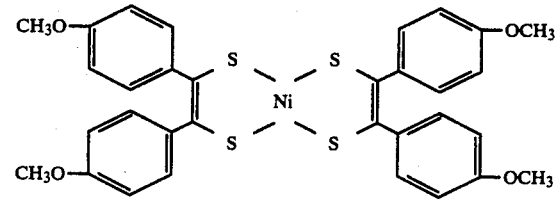

Figure 4:
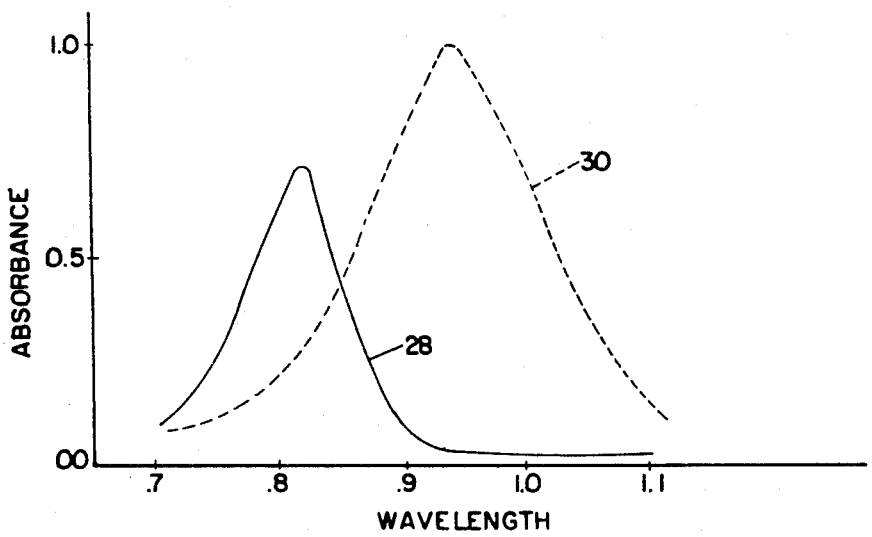
FIG. 4 is a graph showing examples of the spectral absorbance of two metal organic dyes utilized in the radiometer of the invention.

An absorbance spectrum for Dye 1 at a concentration of 0.01 percent by weight of dye to weight of plastic, molded into a 0.040 inch thick sample of polycarbonate, is shown as curve 28 in FIG. 4 wherein the peak absorbance can be seen to occur at 820 nm. For Dye 2 a sample absorbance spectrum was similarly obtained by molding Dye 2 in a concentration by weight of 0.01 percent in a 0.080 inch thick plaque of polycarbonate. The absorbance spectrum for the Dye 2 sample plaque is shown as curve 30 in FIG. 4 wherein the peak absorbance of Dye 2 is seen to occur at 920 nanometers.

Figure 5:
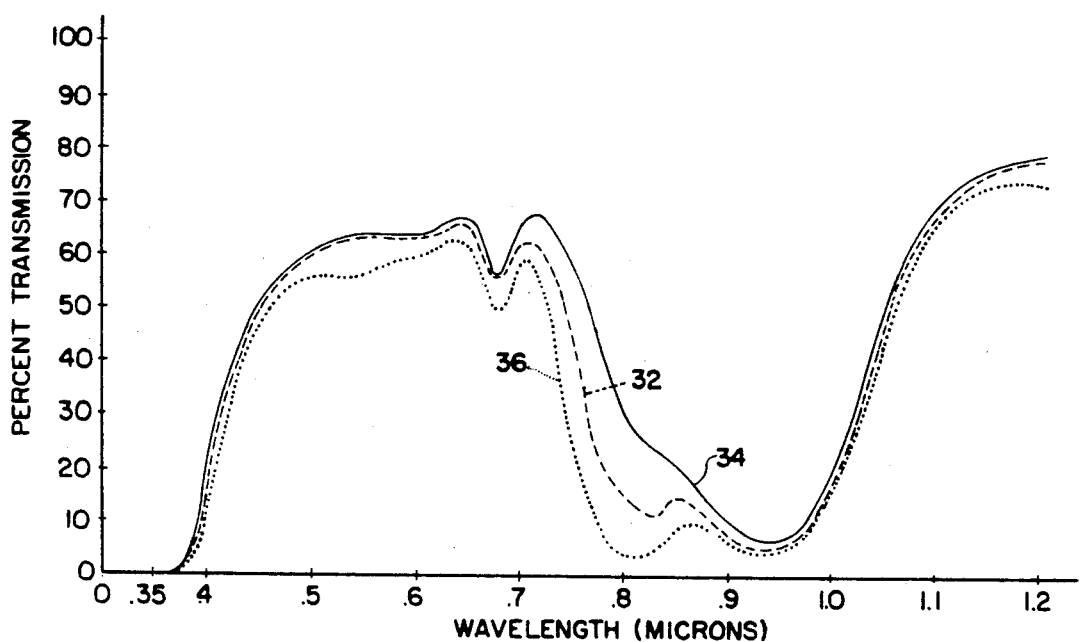
FIG. 5 is a graph showing the spectral transmission of various combinations of concentrations of the two dyes of FIG. 4 when incorporated in an optical element of the invention.

The preferred concentrations by weight of Dyes 1 and 2 for the optical element 22 are 0.003 percent and 0.008±0.001 percent respectively. With the preferred concentrations of Dyes 1 and 2, the optical element 22 is provided with transmission characteristics represented by the curve 32 in FIG. 5 which combines with the relative spectral sensitivity of the diode 12 to provide the radiometer 10 with a preferred relative spectral sensitivity of the invention as represented by the curve 40 in FIG. 6.

Other alternative combinations of concentrations which have been found effective are: Dye 1, 0.002 percent, Dye 2, 0.008 percent; and Dye 1, 0.004 percent, Dye 2, 0.008 percent. The first alternative combination of dye concentrations provides the optical element 22 with the transmission characteristics represented by curve 34 in FIG. 5 and provides the radiometer 10 with the relative spectral sensisitivy represented by curve 38 in FIG. 6, and the second alternative combination of dye concentrations provides the transmission characteristics represented by the curve 36 in FIG. 5 and the relative spectral sensisitivy represented by the curve 42 in FIG. 6.

The range of transmission characteristics provided by the preferred dye concentrations and the two alternative dye concentrations is substantially as represented by the following tabular data:

| λ | T |
|---|---|
| 350 | 0 |
| 400 | 12–20 |
| 450 | 47–52 |
| 500 | 57–61 |
| 550 | 57–64 |
| 600 | 60–65 |
| 650 | 62–67 |
| 675 | 50–57 |
| 700 | 59–66 |
| 750 | 25–59 |
| 800 | 4–32 |
| 850 | 8–22 |
| 900 | 7–11 |
| 950 | 5–7 |
| 1000 | 16–19 |
| 1050 | 45–50 |
| 1100 | 67–71 |
| 1150 | 74–77 |
| 1200 | 75–80 | wherein λ is wavelength in nanometes and T is percentage transmission.

Located intermediate the optical element 22 and the photodetector surface 14 is a neutral density filter 17 (FIGS. 1 or 2) which operates to alternate radiant energy in a spectrally uniform manner for purposes which will be explained hereinafter.

The manner in which the radiometer 10 provides improvements in exposure prediction performance over the prior art may best be understood by examining the differences between its response (output) and the response of a typical prior art photometer to similarly illuminated common subjects of photographs and to a typical high contrast, daylight illuminated, photographic scene. The relative spectral sensitivity of the typical prior art photometer, as previously mentioned, is substantially the same as that of the photopic response of the human eye and is represented by the curve 44 in FIG. 6.

Figure 7:
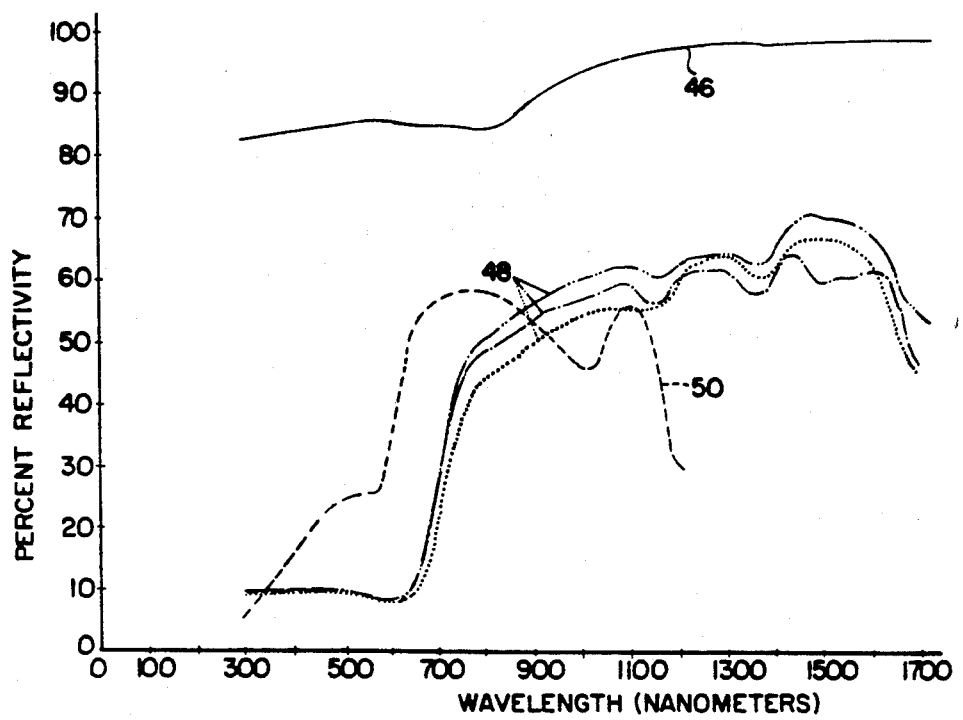
FIG. 7 is a graph showing the spectral reflectivity of common white and black clothing materials and facial skin which may be the subject of a photograph.

Referring now to FIG. 7, there are shown therein graphs of the spectral reflectivities of certain materials which typically comprise a photographic scene wherein curve 46 represents white clothing, curves 48 represent black clothing, and curve 50 represents the average spectral reflectivity of Caucasian skin. It is apparent from the curves of FIG. 7 that all of the materials shown reflect radiation in both the visible and infrared (IR) regions of the spectrum with the greatest differences in reflectivity occurring in the visible region.

Figure 6:
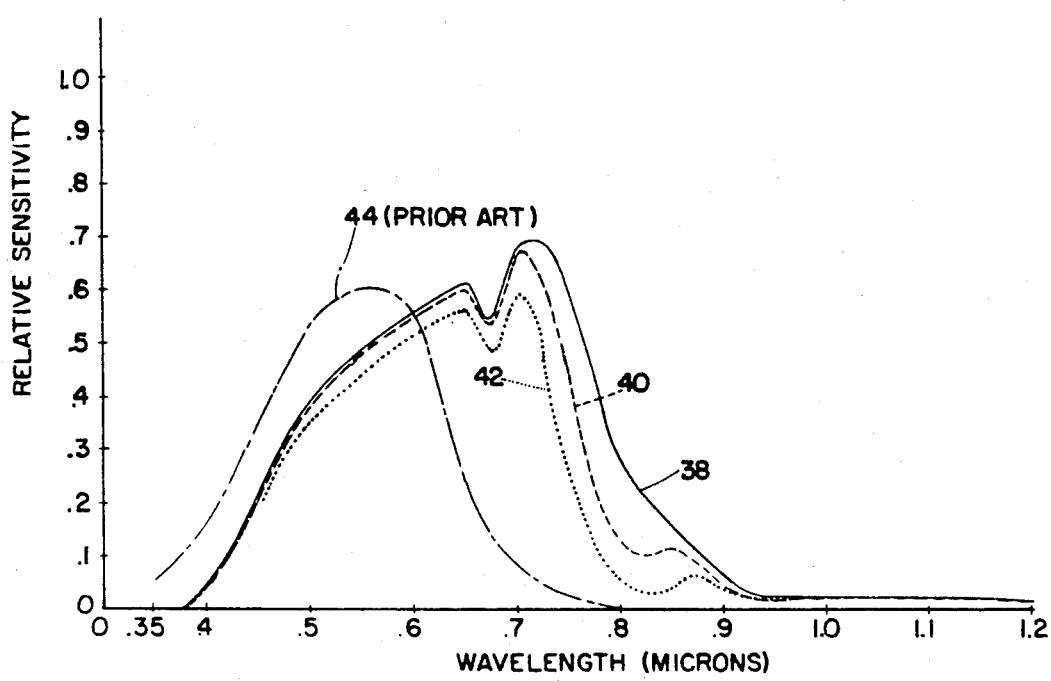
FIG. 6 is a graph showing relative spectral sensitivities of the radiometer of the invention when the optical element thereof has the spectral transmissions shown in FIG. 5 and also includes for comparison the relative spectral sensitivity of a prior art photometer.
Figure 8:
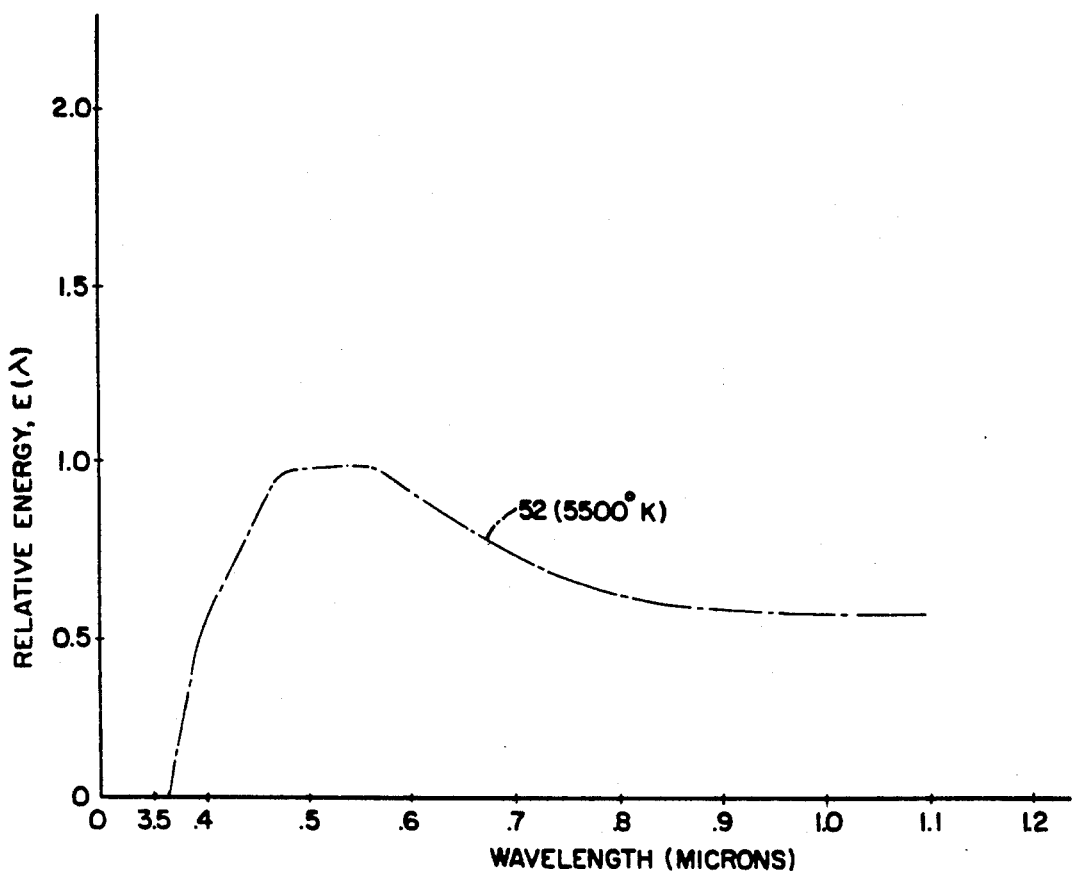
FIG. 8 is a graph showing the relative spectral energy distribution of a 5500° K. color temperature source normalized to 1.0 at 0.56 microns.
Figure 9:
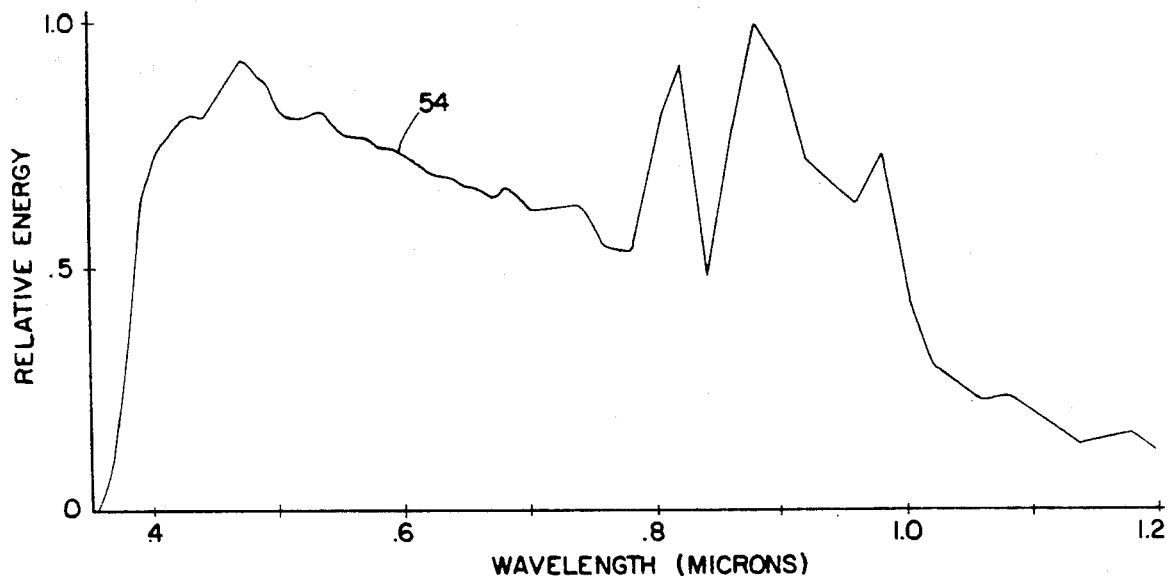
FIG. 9 is a graph showing the relative spectral energy distribution of the radial energy from an electronic strobe device.

As is well-known, the spectral content of radiation reflected from these materials, i.e., the radiation which would be available for collection by the optical systems of either the radiometer 10 of this invention or any prior art photometer, can be determined by computing the products of the curves representing the spectral reflectivities of the various materials associated with the scene to be photographed and the relative spectral energy distribution of the source illuminating the scene and its various associated materials. For purposes of the discussion herein, however, it will be assumed that the relative spectral energy distribution of the radiant energy illuminating the scene generally does not vary as a function of wavelength and thus remains spectrally flat or uniform. Such a radiant energy source could be, for example, ordinary daylight having a correlated color temperature of 5500° K. as shown by curve 52 in FIG. 8 or the light output from a well-known electronic strobe as represented by curve 54 in FIG. 9. Where the source has a generally flat or uniform spectral output, the spectral content of radiation reflected from the scene will generally vary with wavelength in correspondence with the variation in the spectral reflectivity of the materials to be photographed as shown in FIG. 6. Therefore, under conditions where the relative spectral energy distribution of the scene illuminance source is generally uniform or flat, the reflected energy from a material at any part of the scene varies in general correspondence with the spectral reflectivity of that material.

The manner in which the radiometer 10 of this invention responds to radiation reflected from the various materials which typically comprise a photographic scene may best be understood by referring again to FIG. 6. It is apparent from the curve 44, that prior art photometers typically respond only to radiation in the visible region of the spectrum while the radiometer 10, as is apparent from the curves, 38–40, is especially configured to respond to radiation in both the visible and selected IR regions of the spectrum. In other words, prior art photometers are typically sensitive to only differences in visible reflectivities of materials or objects while the radiometer 10 is sensitive to both differences in visible reflectivities and to the IR reflectivities in materials and objects.

As is well-known in the art, the magnitude of the output signal of the typical photometer including the radiometer 10 of this invention varies in direct correspondence with the average amount of radiant energy or power incident to its photodetector surface so as to provide an indication of average scene brightness. The amount of radiant energy in the photodetector surface of the radiometer 10 may be determined also in a well-known manner by integrating the product of the curves representing the spectral radiation available for collection, i.e., the product of the curves representing spectral reflectivities of various scene materials and the spectral radiant energy distribution of scene illumination, and the radiometer spectral sensitivity curve (FIG. 6).

One of the most common exposure prediction or control problems which may cause an exposure error results from the high-contrast scene and in particular from a close up portrait in which the clothes of a person or other surroundings are dark colored and occupy a large part of the scene and are in general relatively less significant than the person's facial features and skin tones. Heretofore, when taking a head-and-shoulders or three-quarters length portrait photograph in daylight with the subject person wearing dark colored clothing as represented by the curves 48 in FIG. 7, an exposure area would have likely arisen as a result of the prior art photometer being sensitive to only visible light and therefore responding primarily to the visible light reflected from the clothes of the subject. Therefore, the exposure prediction would be directly dominated by the low visible reflectivity of the dark colored clothing, and the magnitude of the output signal from the prior art photometer would be less than that required to predict a proper exposure (f-number and shutter speed) of the facial features of the subject. The resultant picture would thus contain overexposed facial tones and would exhibit a loss of detail in facial features.

In response to the aforementioned scene and lighting conditions, the radiometer 10 provides an output signal of greater magnitude because it is sensitive to the IR content of the reflected scene light. The scene-averaged brightness thus appears to be higher resulting in reduction in the exposure time predicted. Since the IR reflectivity of the facial tones and the black clothing are nearly equal as can be seen from FIG. 7, the radiometer 10 predicts a nearly perfect exposure of the face, i.e., 0.0 stops error.

Another exposure prediction or control problem arises when the subject person is wearing light colored clothing or is surrounded by a light colored background and a foreground having reflectivity characteristics represented by the curve 46 in FIG. 7. Under these conditions, the radiometer 10 would predict an exposure interval that would be generally correct for the light colored background or foreground. The resultant picture would contain underexposed facial tones and darkened detail in the person's features since the reflectivity of the white clothing is nearly the same in both the visible and IR regions of the spectrum (FIG. 7, curve 46). Under these conditions, the exposure error to the subject face could be in the order of −1.5 stops.

Figure 10:
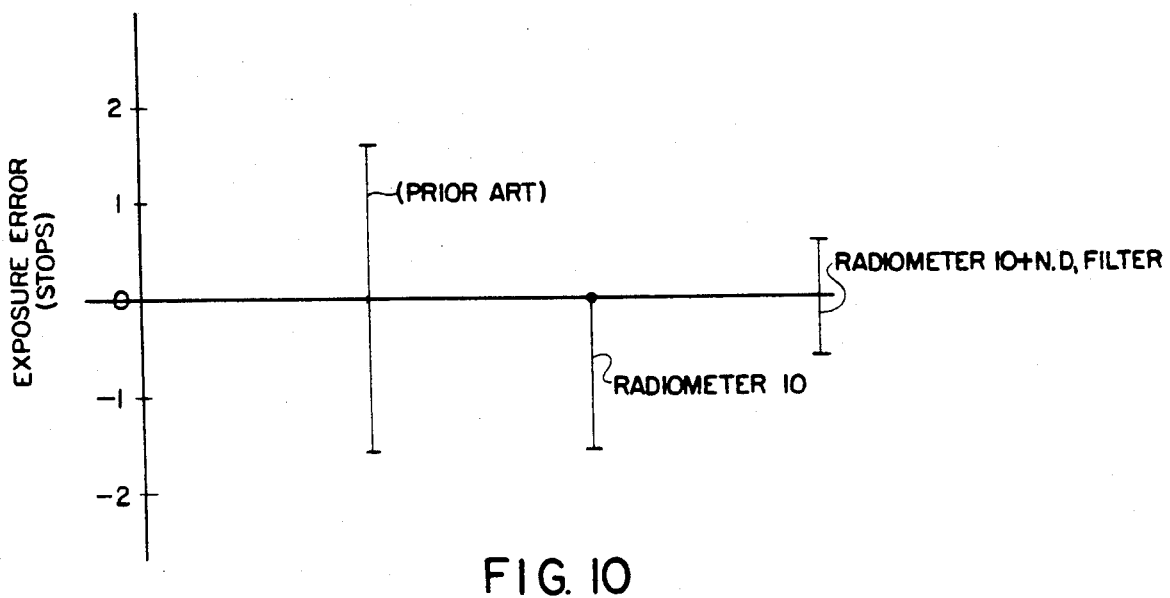
FIG. 10 is a chart comparing the exposure prediction performance of the radiometer of the invention and a prior art photometer under similar scene conditions.

In order to compensate for the aforementioned scene situation in which the subject face is surrounded by light colors, a neutral density (N.D.) filter 17 is provided in the radiometer 10 to reduce the magnitude of the output signal from the radiometer 10. A reduction in the magnitude of the output signal simulates a lower average scene brightness thereby predicting a longer exposure interval to properly expose the face. The reduction in the output signal from the radiometer 10, however, also causes the subject face to be slightly overexposed in the aforementioned situation where the subject face is surrounded by dark colors. This slight overexposure introduced by the N.D. filter 17 represents a reasonable compromise which makes possible an acceptable exposure error for both of the aforementioned scene situations. Preferably the value of the N.D. filter is chosen so that the exposure error for both scene situations is substantially equal (FIG. 10).

Thus, the manner in which the radiometer 10 improves exposure performance takes advantage of the fact that regardless of the differences in the visible spectral region for the light reflectivities of different common subject surroundings as shown in FIG. 7, i.e., dark or light colored clothes, etc., the reflectivities of such surroundings remain substantially the same and generally high in the near infrared region (750–1200 nm) since little IR absorption takes place. Therefore, in scenes where different visible reflectivities, i.e. face surrounded by clothing, are present (or which can be exaggerated by directed light sources such as strobe lights), the radiometer 10 does not attenuate the infrared response of the photocell, but instead leaves it generally intact and undisturbed between approximately 650 and 850 nanometers. The lower limit of 650 nm is chosen because at this point (see FIG. 7 again) IR reflectivity of darker objects begins to increase and the upper limit of 850 nm is chosen because the IR reflectivities of most materials begin to match one another and no useful information is gained by sensing beyond 850 nm. Furthermore, the IR content of common ambient sources differ strongly above 850 nm and therefore the ambient component of a photographic exposure would be controlled less accurately if the photometer has any substantial response above 850 nm.

Based on the foregoing considerations and on actual photographic performance of radiometers having relative spectral sensitivities as represented by the curves 38, 40 and 42 of FIG. 6, the preferred relative spectral sensitivity for the radiometer 10 of the invention has been determined to be in the wavelength region from 350 to 1200 nm. In this region, the radiometer 10 has substantially no sensitivity at wavelengths less than 350 nm and has an integrated spectral sensitivity (areas under curve) beyond 850 nm which is no more than 10 percent of its total integrated value from 350 to 1200 nanometers and is further characterized in that the integral thereof from 350 to 700 nanometers is between 50 and 60 percent of its total integrated value from 350 to 1200 nanometers and wherein the integral thereof from 700 to 850 nanometers is between 30 and 40 percent of its total integrated value.

Although the preferred range of relative spectral sensitivities for the radiometer of the invention can result in some mis-exposure where the correlated color temperature of the scene illumination source is <2800° K., such scene situations typically will be illuminated by rising or setting sunlight, or by tungsten bulbs, and are frequently of low light level and tend to require longer than convenient exposure times. Color photography under these low color temperatures also will be unbalanced by the absence of blue (and green) light, rendering all objects in yellow, orange, and red hues. However, the improved performance gained with the preferred relative spectral sensitivity of the radiometer of this invention for the more commonly occurring "high contrast" scenes outweighs the mis-exposure problems that may occur with the above-mentioned, less common, low color temperature, low light level scenes. For example, the difference in exposure prediction for the two portrait conditions previously described is only one stop, compared with the prior art difference of three stops.

Method of Manufacture

The preferred method for making the optical element 22 comprises first preparing color concentrates of Dyes 1 and 2 in the form of pelletized extrudates. These dye color concentrates are prepared in the following manner.

A mixture corresponding to each dye is first prepared by adding each dye in powdered crystalline form in a concentration by weight of 0.1 percent dye to clear optical plastic pellets comprising either a high melt index polycarbonate or polystyrene. Preferably a UV stabilizer such as Cyasorb 5411 manufactured by American Cyanamid is added to this mixture in a concentration by weight of 0.25 percent. In addition, it is preferable to add polymer stabilizers in fixed concentrations by weight to prevent degradation of the optical plastic. For this purpose, it is recommended to include a hydroperoxide decomposer such as that sold under the trademark SANDOSTAB, concentration 0.1 percent, in combination with an antioxidant such as Irganox 1010 or 1076, concentration 0.2 percent, manufactured by CIBA-GEIGY.

Each dye mixture is then dry tumbled for a predetermined period of time preferably between 20 and 30 minutes.

An adhesive liquid processing aid of predetermined concentration by weight is then added to the tumbled mixture to promote binding between the dyes and optical plastic pellets and the mixtures are dry tumbled for another predetermined time period, preferably 30 minutes. When polycarbonate is the plastic, an adhesive liquid processing aid found effective has been a phthalate ester preferably butylbenzylphthalate in a concentration of between 0.01–0.2 percent by weight thereof to weight of polycarbonate. And when polystyrene is the optical plastic, an effective adhesive liquid processing aid comprises dimethylsulfoxide or sulfolane, tetrahydrothiophene-1,1-dioxide, in a concentration of 0.1 percent by weight thereof to weight of optical plastic. In the case of polystyrene, the liquid processing aid also serves as a solvent carrier to promote the dissolution of the dyes in the plastic.

After the second dry tumbling step, the dye color concentrate mixtures are each transferred to a metal tray, and the tray is placed in a forced dry air circulating oven for a predetermined time and at a predetermined temperature, below the melt temperature of the optical plastic, to remove moisture from the mixtures. Four hours at 250° F. has been found effective for this purpose.

The dried dye concentrate mixtures are then separately extruded to uniformly distribute the Dyes, 1 and 2, throughout the optical plastic material to obtain dye extrudates of the optical plastics in which the Dyes, 1 and 2, are homogeneously present. Each extrudate is then formed into pellets in a well-known manner.

The exact concentrations of Dye 1 and Dye 2 in its respective pelletized concentrate is then determined and the amount of each color concentrate extrudate necessary to dilute the dyes, 1 and 2, to predetermined concentrations by weight, when mixed with an additional amount of clear optical plastic is then calculated. In this manner, more precise control over the final dye concentrations is made possible.

After determining the amount of pelletized dye concentrates required, a final mixture of the pelletized dye concentrates, the clear optical plastic pellets, the UV absorber, and antioxidants and polymer stabilizer is prepared and dry tumbled as above. This tumbled mixture is then placed in an oven to remove moisture as above and afterwards is extruded to uniformly distribute both Dyes 1 and 2 throughout the optical plastic. During this stage, the Dyes 1 and 2 are at least partially dissolved throughout the optical plastic material. Injection molding of the final extrudate is then performed at a predetermined temperature where the extrudate is molded into a predetermined form, preferably as the optical element 48. The molding temperature for polycarbonate is preferably between 425° F. and 525° F. and for polystyrene between 400° F. and 525° F. To prevent degradation of the dyes, 1 and 2, it is preferred that they should be subjected to temperatures no higher than 525° F. throughout the process.

An alternative method with less precise control over the final dye concentrations and involving more trial and error steps dispenses with the above method steps of preparing the color concentrate pelletized extrudates and proceeds directly to preparing a mixture of the dyes with the optical plastics, the UV absorber, the polymer stabilizer, the antioxidant, and the liquid adhesive processing aid/solvent carrier in their final concentrations. Afterwards the mixture is dried, extruded and molded as above.

Alternate Embodiment

Figure 11:
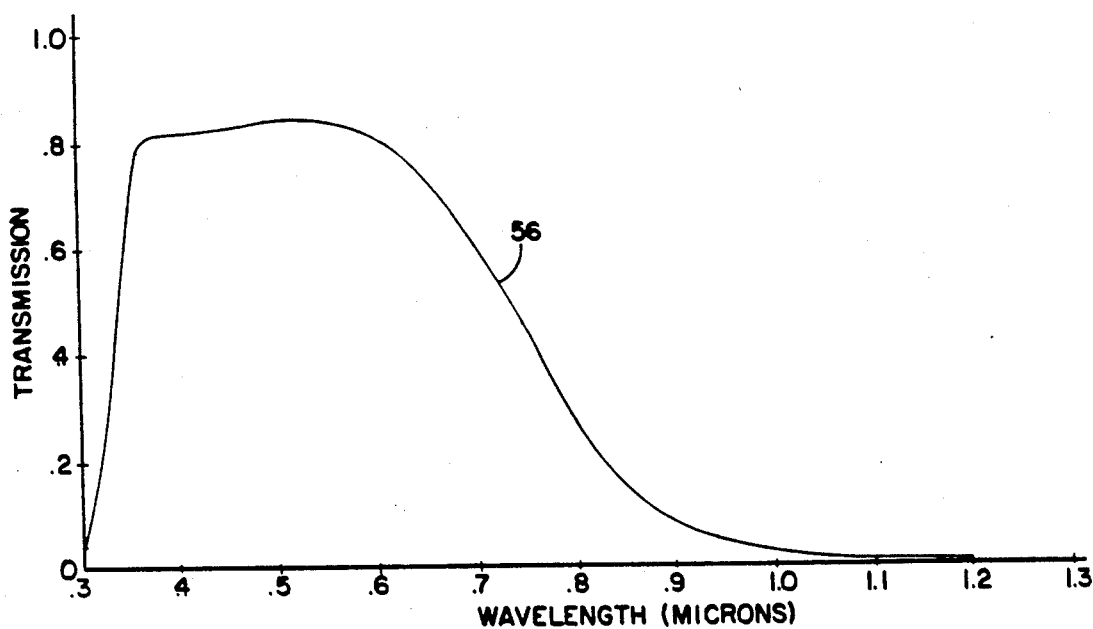
FIG. 11 is a graph showing the spectral transmission of a filter which can be used to provide an alternate embodiment of the radiometer of the invention.

An alternate embodiment of the radiometer of the invention, having the inventive preferred relative spectral sensitivity characteristics, is provided by placing a filter (not shown) adjacent the N.D. filter 17 instead of molding the dyes, 1 and 2, in the optical element 22. Such a filter preferably has the spectral transmission characteristics represented by the curve 56 of FIG. 11 and the following tabular data:

| λ | T |
|---|---|
| 350 | <.5 |
| 400 | .78 |
| 450 | .82 |
| 500 | .83 |
| 550 | .82 |
| 600 | .75 |
| 650 | .67 |
| 700 | .55 |
| 750 | .42 |
| 800 | .33 |
| 850 | .25 |
| 900 | .2 |
| 950 | .17 |
| 1000 | .15 |
| 1050 | .15 |
| 1100 | .15 |
| 1150 | .15 |
| 1200 | .15 | wherein $\lambda$ is wavelength in nanometers and T is transmission.

Figure 3:
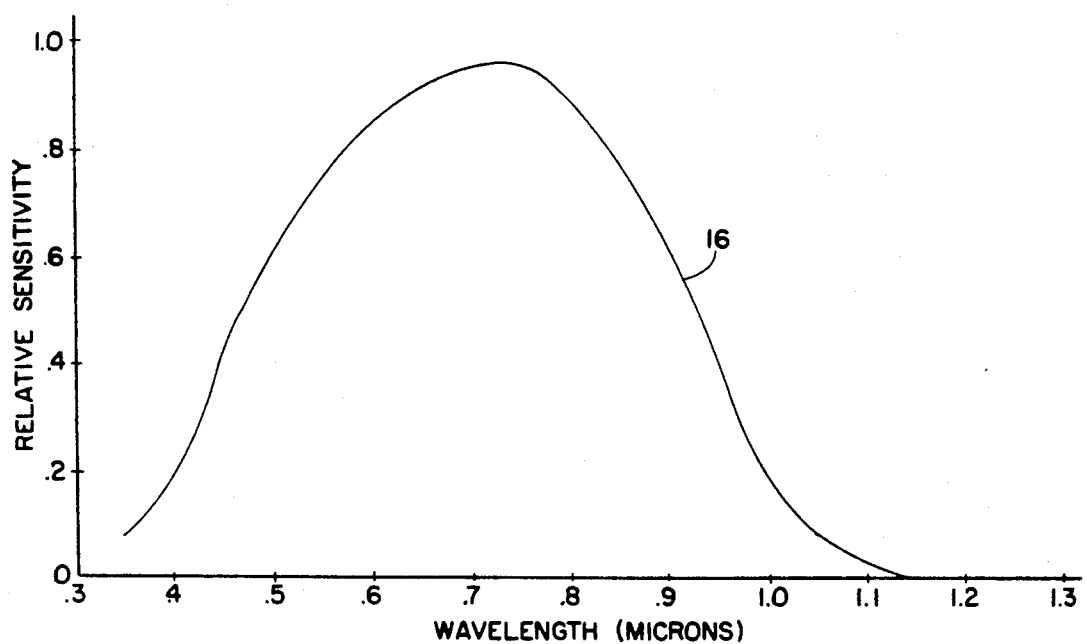
FIG. 3 is a graph showing the relative spectral sensitivity of a silicon photodiode which forms part of the radiometer of FIGS. 1 and 2.
Figure 12:
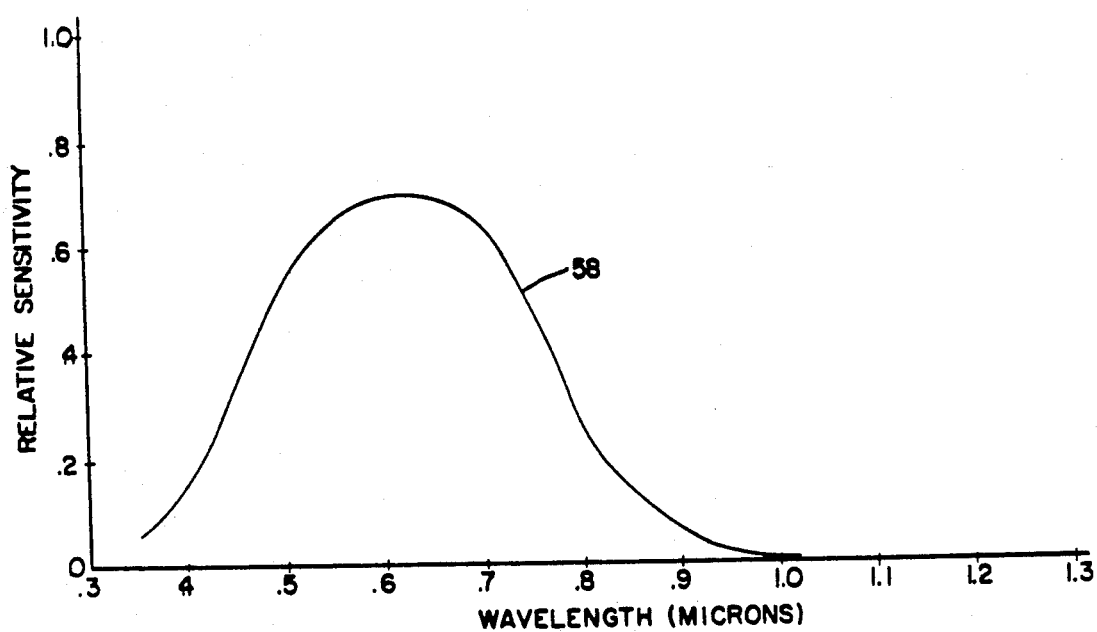
FIG. 12 is a graph showing the relative spectral sensitivity of the alternate embodiment of the invention.

When combined with the relative spectral sensitivity for the silicon photodiode as represented by the curve 16 of FIG. 3, the alternate radiometer has the relative spectral sensitivity as shown in FIG. 12 by the curve 58 and as represented by the following tabular data:

| λ | S |
|---|---|
| 350 | <.014 |
| 400 | .23 |
| 450 | .53 |
| 500 | .83 |
| 550 | .99 |
| 600 | 1.0 |
| 650 | .97 |
| 700 | .89 |
| 750 | .61 |
| 800 | .31 |
| 850 | .17 |
| 900 | .071 |
| 950 | .028 |
| 1000 | 0 |
| 1050 | 0 |
| 1100 | 0 |
| 1150 | 0 |
| 1200 | 0 | wherein $\lambda$ is the wavelength of radiant energy in nanometers and S represents the magnitude of the output signal of the radiometer of the invention normalized to 1.0 at maximum response.

One commercially available optical filter with the above characteristics is manufactured by Corning Glass of New York and is designated as an Infrared Absorbing Visible Transmitting Filter with the No. 1-75.

Although the alternate embodiment of the radiometer is photographically equivalent in performance to the preferred embodiment of the invention, it is relatively more expensive to manufacture and would require the additional step of mounting the filter in the path of the radiation emerging from the lens 22 (FIG. 1).

Certain changes may be made in the above-described embodiments and methods without departing from the scope of the invention, and those skilled in the optical and injection molding arts may make still other changes according to the teachings of the disclosure.

For example, dye concentrations and thicknesses may be adjusted for the relative sensitivity of a particular photodetector to achieve the preferred relative spectral sensitivities of the present invention. In the present invention, the thickness used for determining the dye concentrations was 0.108 inches, a distance which represents the average optical path length over which most rays from a scene would travel in passing through the lens 22. Therefore, it is intended that all matter contained in the above description or shown in the accompanying drawings shall be interpreted as illustrative and not in a limiting sense.

What is claimed is:

1. An optical element for filtering infrared light comprising at least one metal-organic infrared absorbing dye at least partially dissolved homogeneously throughout a molded optical plastic.

2. The element of claim 1 wherein said infrared absorbing dye comprises a metal complex of the formula:

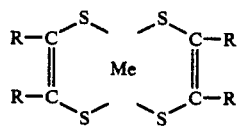

wherein Me is selected from the group consisting of metals of the first, second, and third transition metal series which will provide a complex that is an effective infrared absorber and which is effectively transparent to light in the visible region of the spectrum; and each R is selected from the group consisting of hydrogen, alkyl, aromatic, heterocyclic and nuclearly substituted aromatic and heterocyclic rings.

3. The element of claim 2 wherein said metal complex is chosen from the group consisting of

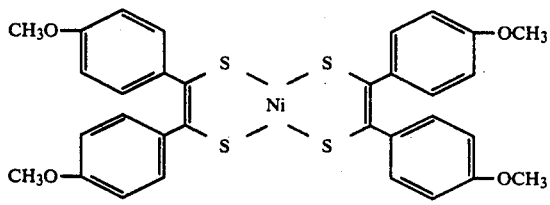

or

-continued

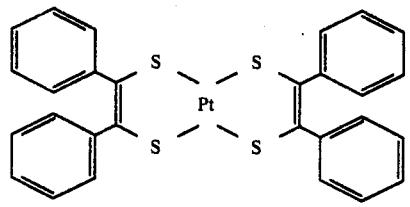

or mixtures of these.

4. The element of claim 3 wherein said optical plastic comprises polycarbonate or polystyrene and wherein said infrared absorber consists essentially of a mixture selected from said metal complex groups of claim 3 wherein the concentration of said first mentioned metal complex group is between 0.007 and 0.009 percent by weight of dye to weight of said optical plastic and has a peak absorbance at 920 nm and wherein the concentration of said second mentioned metal complex group is between 0.002 and 0.004 percent by weight of dye to weight of said optical plastic and has a peak absorbance at 820 nm.

5. The element of claim 4 wherein said optical plastic is preferably polycarbonate and wherein said optical element is molded in the form of a positive lens element of predetermined focal length.

6. The element of claim 2 wherein said optical plastic comprises polycarbonate or polystyrene.

7. The element of claim 6 wherein said optical element is molded in the form of a positive lens element of predetermined focal length.

8. An optical element for use in a radiometer of the type which includes a photoelectric cell that has a predetermined surface and spectral sensitivity and provides an output signal having an electrical characteristic that varies in accordance with the intensity of radiant power incident on its surface, said optical element comprising a positive lens of predetermined focal length molded of an optical plastic comprising polycarbonate or polystyrene for collecting radiant energy to direct said collected radiant energy onto the photoelectric cell surface and including at least one metal-organic infrared absorbing dye at least partially dissolved homogeneously throughout and commonly molded with said optical plastic for selectively attenuating the spectral content of said collected radiation.

9. The element of claim 8 wherein said infrared absorbing dye comprises a metal complex of the formula:

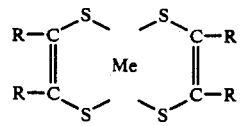

wherein Me is selected from the group consisting of metals of the first, second and third transition metal series which will provide a complex that is an effective infrared absorber and which is effectively transparent to light in the visible region of the spectrum; and each R is selected from the group consisting of hydrogen, alkyl, aromatic, heterocyclic and nuclearly substituted aromatic and heterocyclic rings.

10. The element of claim 9 wherein said metal complex is chosen from the group consisting of

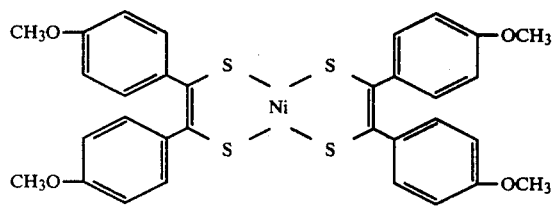

or

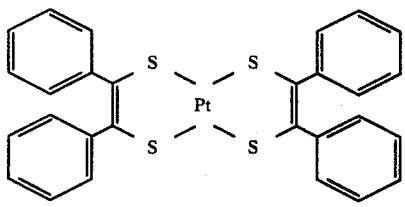

or mixtures of these.

11. The element of claim 10 wherein said optical plastic comprises polycarbonate or polystyrene and wherein said infrared absorber consists essentially of a mixture selected from said metal complex groups of claim 10 wherein the concentration of said first mentioned metal complex group is between 0.007 and 0.009 percent by weight of dye to weight of said optical plastic and has a peak absorbance at 920 nm and wherein the concentration of said second mentioned metal complex group is between 0.002 and 0.004 percent by weight of dye to weight of said optical plastic and has a peak absorbance at 820 nm.

12. The element of claim 10 wherein said infrared absorbing dye consists of a mixture of said metal complex groups mentioned in claim 10 in concentrations such that the spectral transmission characteristics of said elements are within the limits substantially as represented in the following tabular data:

| λ | T |
|---|---|
| 350 | 0 |
| 400 | 12-20 |
| 450 | 47-52 |
| 500 | 56-61 |
| 550 | 57-64 |
| 600 | 60-65 |
| 650 | 62-67 |
| 675 | 50-57 |
| 700 | 59-66 |
| 750 | 25-59 |
| 800 | 4-32 |
| 850 | 8-22 |
| 900 | 7-11 |
| 950 | 5-7 |
| 1000 | 16-19 |
| 1050 | 45-50 |
| 1100 | 67-71 |
| 1150 | 74-77 |
| 1200 | 75-80 | wherein λ is wavelength in nanometers and T is percentage transmission.

* * * * *